United States Patent [19]

Dennis

[11] Patent Number: 4,573,823

[45] Date of Patent: Mar. 4, 1986

[54] ADJUSTABLE PASS-THROUGH JOINT

[76] Inventor: Victor S. Dennis, 13342 Mango Dr., Del Mar, Calif. 92014

[21] Appl. No.: 695,470

[22] Filed: Jan. 28, 1985

[51] Int. Cl.$^4$ .......................... F16B 7/18; F16C 11/00
[52] U.S. Cl. .................................... 403/118; 403/343; 403/323; 248/354.4
[58] Field of Search ...................... 403/118, 323, 343; 248/354.4

[56] References Cited

U.S. PATENT DOCUMENTS 1,000,125  8/1911  Schulz .............................. 403/118 X
3,856,421 12/1974  Nogler ................................. 403/118

Primary Examiner—Andrew V. Kundrat

[57] ABSTRACT

An adjustable pass-through joint comprising a main joint body having a first bore longitudinally therethrough, a second bore orthogonally intersecting said first bore, a third bore intersecting said second bore and a fourth bore intersecting said second bore, a cylindrical locking member rotatably mounted within said second bore and having a partially-threaded opening in line with said first bore, a threaded rod slideably installed within said joint body, and a shaft insertable within said third bore which, by wedging itself between one side of said third bore and a cut-away surface on said locking member, retains said cylindrical member in an angular position where the threads of said partially-threaded opening are locked with the threads of said rod, preventing longitudinal movement of said rod within said joint body. When said shaft is removed from said joint body, a compressed spring mounted within said fourth bore applies torque to a notch cut in the cylindrical surface of said locking member, causing it to rotate to an angular position where the threads of said partially-threaded opening are disengaged from the threads of said rod, thus allowing longitudinal movement of said rod within said joint body. A cam may be cut on said shaft in a position where it will act on said cut-away surface so that the frictional force between the threads of said locking member and those of said rod varies as said shaft is rotated.

8 Claims, 8 Drawing Figures

U.S. Patent  Mar. 4, 1986  4,573,823
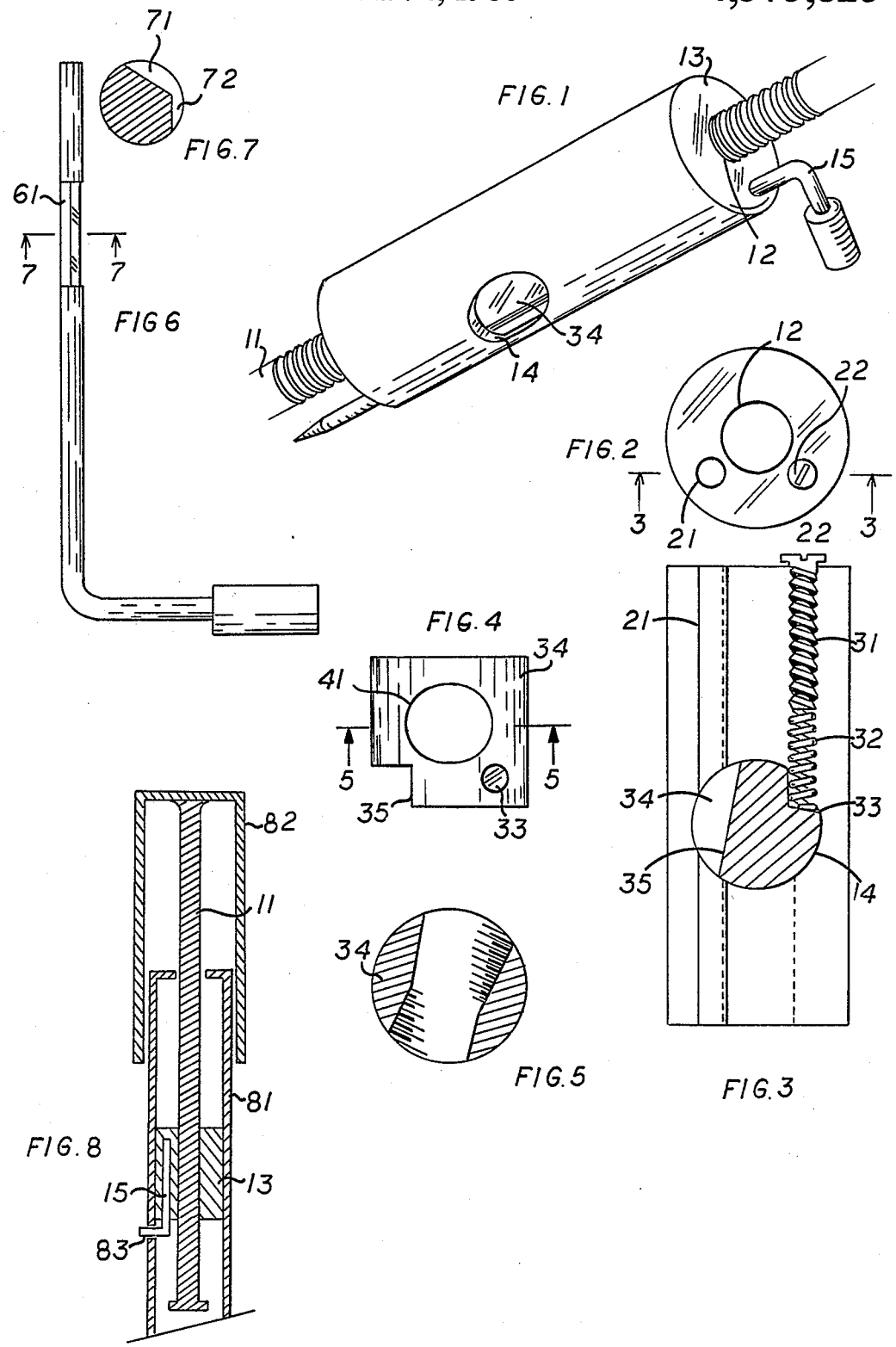

ADJUSTABLE PASS-THROUGH JOINT

FIELD OF THE INVENTION

The present invention relates to rapidly adjustable telescopic joints or support braces commonly used for height adjustment, and especially those used for heavy-load conditions.

BACKGROUND OF THE INVENTION

Although numerous devices have been devised for telescopic support structures, few, if any, of those capable of supporting heavy loads possess rapid coarse adjustment capability, as well as fine adjustment capability. Solar panels are relatively heavy and must be adjusted seasonally with a fair degree of precision. The inventor has been unable to find a telescopic joint ideally suited for use with heavy solar panels.

SUMMARY OF THE INVENTION

The objective of the present invention is to provide a high-load capacity telescopic joint with rapid coarse adjustment capability and fine adjustment capability. The present invention achieves this capability: A threaded rod is slideably installed within a main joint body, passing through a diametrically-positioned, partially-threaded opening in a cylindrical locking member which is rotatably installed within said main joint body. The rod is prevented from sliding within said joint body when said locking member is rotated in one angular direction. In this position, the threads of said locking member engage those of said threaded rod. When said locking member is rotated in the opposite angular direction the two sets of threads are disengaged and said rod is free to slide within said joint body. With the locking member in the locked position, said rod may still be adjusted by rotating it while maintaining the joint body stationary. The locking member may be secured in its locked position by means of a locking shaft which, when inserted in a locking bore in the joint body, wedges between one side of said locking bore and a flat chordally-machined cut-away surface on the locking member, much the same way that a threepiece cotter-type bicycle crankset is locked together.

BRIEF DESCRIPTION OF THE DRAWINGS

FIG. 1 is a perspective view of the adjustable pass-through joint;

FIG. 2 is a bottom plan view of the main joint body;

FIG. 3 is a cross-sectional view taken on line 3—3 of FIG. 2;

FIG. 4 is a top plan view of the cylindrical locking member;

FIG. 5 is a cross-sectional view taken on line 5—5 of FIG. 4;

FIG. 6 is an elevational view of a second embodiment of the locking shaft;

FIG. 7 is a cross-sectional view taken on line 7—7 of FIG. 6; and

FIG. 8 is an elevational view of the adjustable pass-through joint incorporated into a telescoping leg arrangement.

DESCRIPTION OF THE PREFERRED EMBODIMENT OF THE INVENTION

Referring now to FIG. 1, threaded rod 11 is slideably installed within a first bore 12 within main joint body 13. Threaded rod 11 may be locked within joint body 13 by means of a cylindrical locking member 34 rotatably installed in a second bore 14 in joint body 13, the axis of which orthogonally intersects that of first bore 12. The functions of locking shaft 15 and of spring-retaining screw 22 will be described below.

FIG. 2, a bottom plan view of joint body 13, clearly shows first bore 12 in which rod 11 can be slideably installed, third bore 21 within which locking shaft 15 can be inserted, and the slotted head of spring-retaining screw 22.

The cross-sectional view of FIG. 3 shows retaining screw 22 secured in threaded fourth bore 31. The screw compresses spring 32, which acts against notch 33, which is positioned on the cylindrical surface of locking member 34. The force imparted by spring 32 causes locking member 34 to rotate clockwise to its unlocked position when locking shaft 15 is withdrawn from joint body 13. When inserted in bore 21, locking pin 15 is wedged between one side of bore 21 and the chordally-machined cut-away surface 35 of locking member 34, preventing rotation of the latter.

Referring now to FIG. 4, rod 11 passes through tapered bore 41 in cylindrical locking member 34. Locking member 34, which is rotatably installed within second bore 14, has two functional positions: a locked position and an unlocked position. When inserted in joint body 13, locking shaft 15, acting as a pusher, maintains locking member 34 in the locked position. Only one edge of chordally-machined cut-away surface 35 is visible in this view. Notch 33 is seen from above in this view.

FIG. 5, a cross-sectional view through the center of tapered bore 41 reveals the locking mechanism. Bore 41 is created by drilling a hole, the axis of which orthogonally intersects the cylindrical axis of locking member 34, through said locking member. This hole is tapped to match the threads of rod 11. Locking member 34 is then rotated through a ten to 20-degree angle, then relieved with a ream or drill bit having a diameter sufficient to allow rod 11 to slide through the hole at that angle without galling. In the reaming or drilling process, bore 41 became oblongly tapered at both ends as threads were removed from opposite sides of the hole at its ends. As is now evident, when cylindrical locking member 34 is rotated in one angular direction, the threads remaining in bore 41 will mesh with the threads of rod 11, preventing rod 11 from sliding within joint body 13. Even in the locking position, rod 11 may be extended or distended by rotation. When rotated in the oposite direction, the rod is able to slide freely through locking member 34 and, hence, within joint body 13.

An alternate embodiment of locking shaft 15 is clearly shown in FIG. 6. A bi-faceted cam 61 may be cut in the shank portion of shaft 15 to allow varying degrees of contact pressure with the cut-away surface 35 of locking member 34.

FIG. 7 shows a cross-sectional view of cam 61. Face 71 allows locking member 34 to remain in the unlocked position. Face 72 moves locking member 34 to the locking position by applying a torqing force in relation to the axis of locking member 34. If locking shaft 15 is further rotated until the cylindrical face contacts cut-away surface 35, the increased contact pressure on threaded rod 11 prevents any axial rotational travel.

FIG. 8 shows the invention incorporated into a telescoping support member. Joint body 13 is secured to the inner walls of inner tube 81, while the end of rod 11 is secured to the end of outter sliding tube 82. A slot 83 in the wall of tube 81 allows locking shaft 15 to be rotated for the actuation of cam 61.

While the preferred embodiments of the invention has been disclosed, other embodiments may be devised and modifications made within the spirit of the invention and within the scope of the appended claims. For example, an alternate inferior embodiment of the invention may be made by using a rod which, instead of being spirally threaded, is machined longitudinally with evenly-spaced circular grooves. The spiral threads within the cylindrical locking member must then be modified to match the pitch of said circular grooves. Such an adjustable passthrough joint lacks the fine adjustment capability that can be achieved by rotating the threaded rod 11 of the preferred embodiment of the invention, while maintaining the main joint body 13 stationary.

What is claimed is:

1. An adjustable pass-through join comprising:
   a main joint body having
      a first bore longitudinally therethrough, and
      a second bore orthogonally intersecting said first bore;
   a clamping member rockingly inserted into said second bore and having an opening in line with said first bore;
   a rod slideably installed through said first bore and said opening;
   wherein said opening is shaped and dimensioned to permit free axial travel of said rod therethrough when said locking member is held in a first position, and to prevent the axial travel of said rod when said clamping member is held in a second position; and
   means for locking said clamping member in said second position including means for rotating said clamping member about the axle of said second bore until opposite sides at opposite ends of said opening are forced against said rod.

2. The adjustable pass-through joint of claim 1 wherein said means for rotating comprises a pusher within said second bore applying a torque to said clamping member in relation to the axis of said second bore.

3. The adjustable pass-through joint of claim 2 wherein said pusher comprises:
   said joint body having a third bore passing through said second bore;
   a rotatable shaft mounted within said third bore; and
   a cam on said shaft acting against said clamping member.

4. An adjustable pass-through joint comprising:
   a main joint body having
      a first bore longitudinally therethrough, and
      a second bore orthogonally intersecting said first bore;
   a cylindrical locking member rotatably mounted within said second bore and having an opening in line with said first bore;
      wherein both ends of said opening within said locking member are tapered circumferentially and symmetrically about the axis of said rod;
      said opening has locking threads on opposite sides and opposite ends;
      said locking threads are symmetrical about a circumferential plane of said cylindrical locking member;
      said locking threads interlock with the threads of said rod when said locking member is rotated in a first angular direction, and disengage from the threads of said rod when said locking member is rotated in a second angular direction opposite to the first;
   means for locking said cylindrical locking member in said first angular position; and
   a threaded rod slideably installed within said body.

5. The adjustable pass-through joint of claim 4 wherein said means for locking comprises:
   said cylindrical locking member having a chordally-machined cut-away surface;
   said joint body having a third bore; and
   a shaft insertable into said third bore which is shaped and positioned to wedge itself between one side of said third bore and said chordally-machined cut-away surface.

6. The adjustable pass-through joint of claim 5 which additionally comprises a resilient means for maintaining said cylindrical locking member in the position where its threads are disengaged from those of said rod when said locking pin is removed from said third bore.

7. The adjustable pass-through joint of claim 6 wherein said resilient means for maintaining comprises:
   said bocking member having a notch cut in its cylindrical wall; and
   said joint body having a fourth bore intersecting said second bore; and
   a spring compressed within said fourth bore which acts on said notch, applying torque to said cylindrical locking member in said second angular direction.

8. The adjustable pass-through joint of claim 7 wherein said shaft is rotatable within said third bore and fitting with a cam positioned to operate on said chordally-machined cut-away surface as the shaft is rotated, thus varying the clamping force between the threads of said rod and said locking threads.

* * * * *